(No Model.) 5 Sheets—Sheet 4.
F. H. RICHARDS.
WEIGHING MACHINE.

No. 585,986. Patented July 6, 1897.

Witnesses:
O. W. Smith
Fred. J. Dole

Inventor:
F. H. Richards (No Model.)　　　F. H. RICHARDS.　　5 Sheets—Sheet 5.
WEIGHING MACHINE.
No. 585,986.　　　　Patented July 6, 1897.
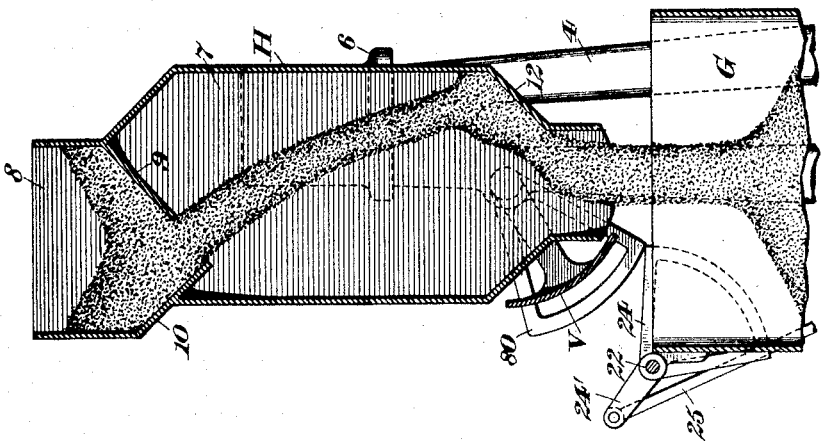
Witnesses:
C. W. Smith
Fred. J. Dole
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,986, dated July 6, 1897.

Application filed February 20, 1897. Serial No. 624,417. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide certain improved organizations of mechanisms, more especially intended for application to machines of the kind disclosed by Letters Patent No. 572,067, granted to me November 24, 1896.

Figure 1:
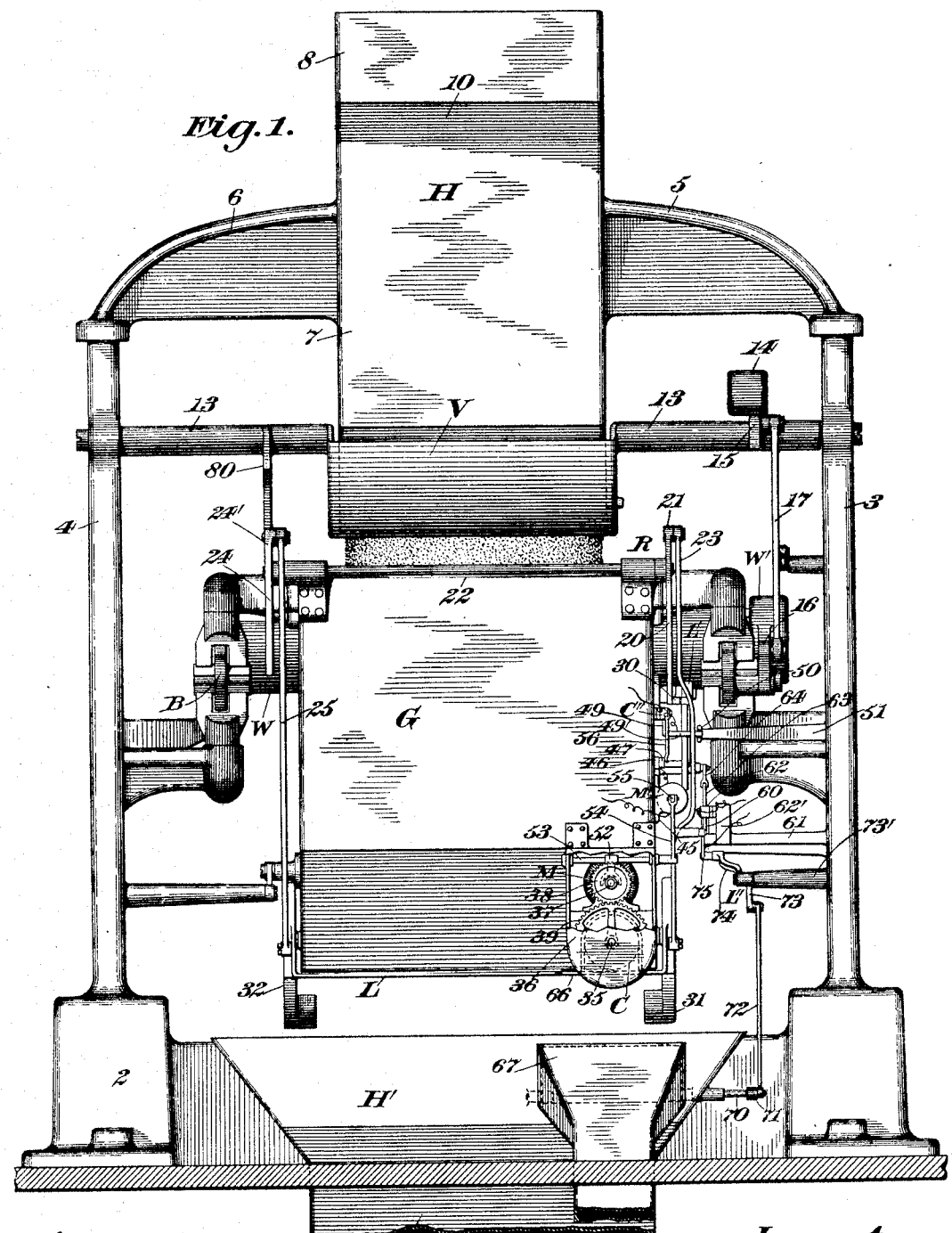
Figure 2:
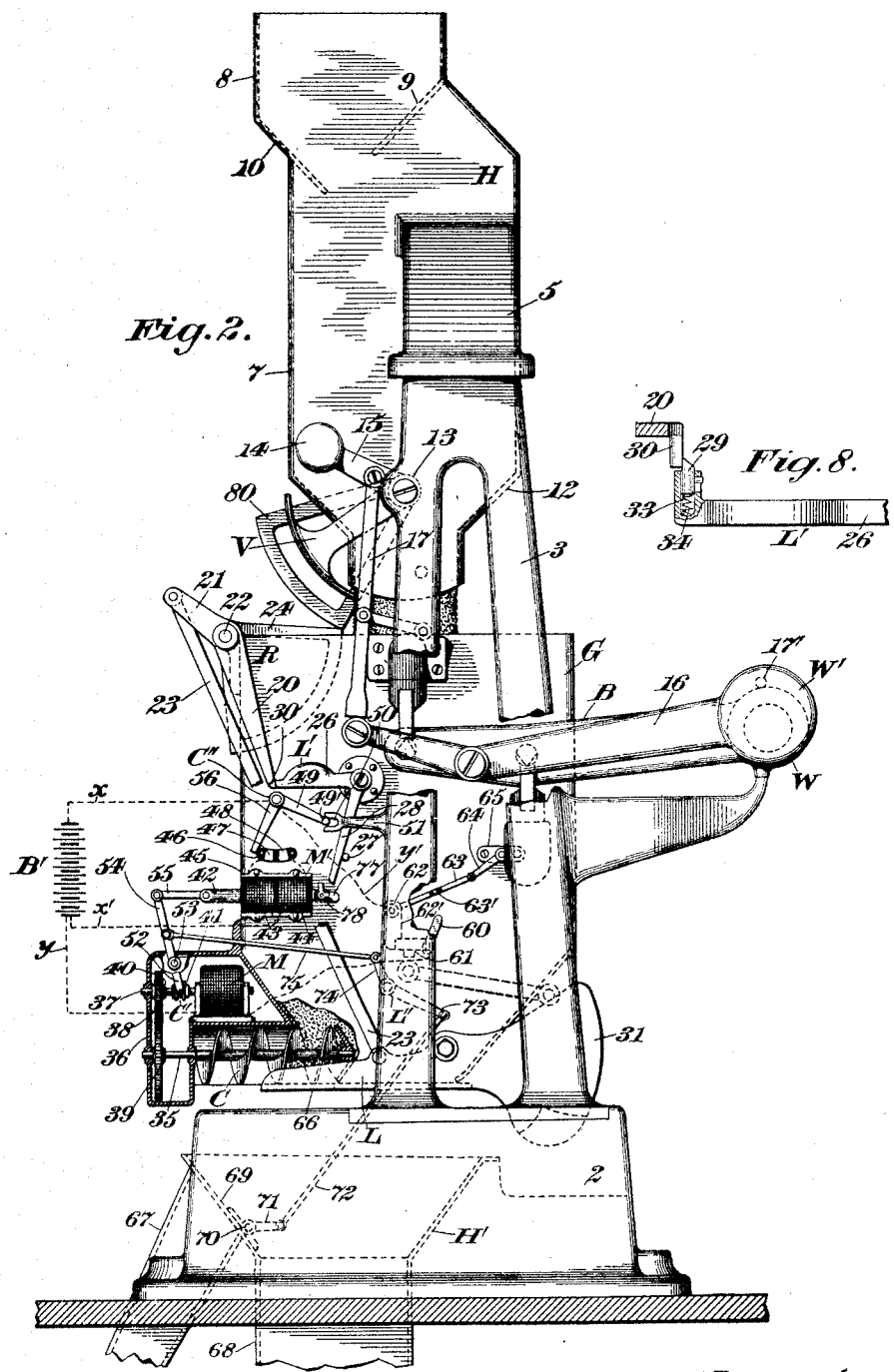
Figure 3:
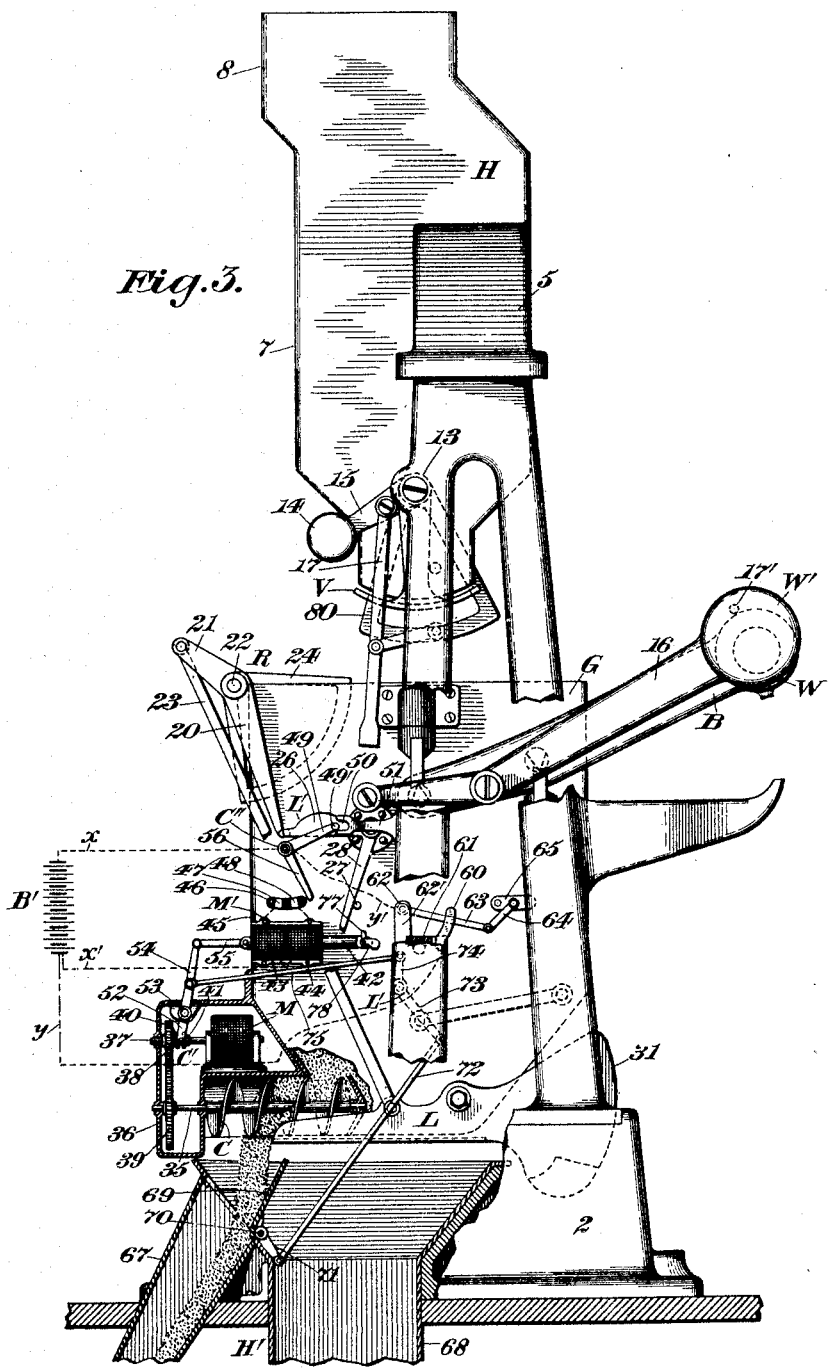
Figure 4:
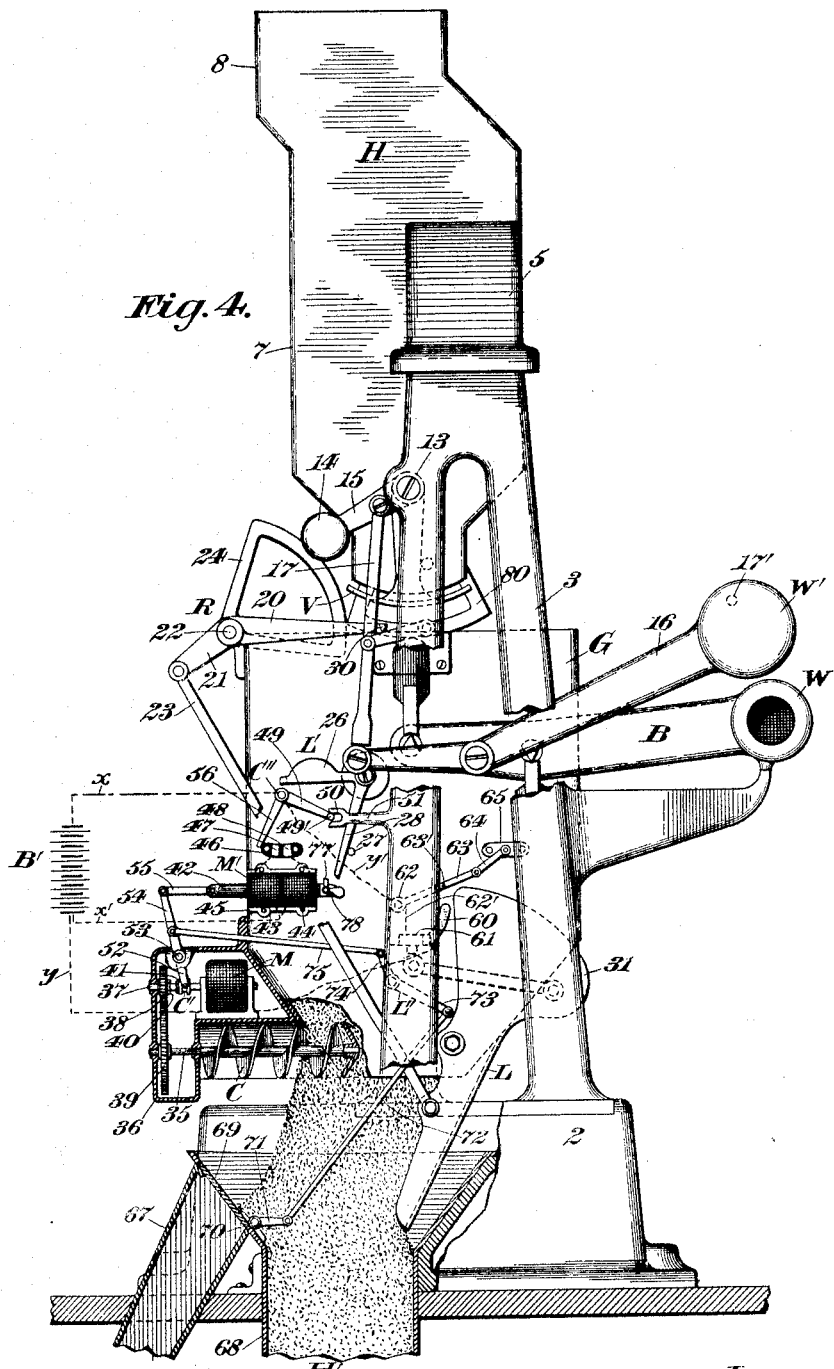

In the drawings accompanying and forming part of this specification, Figure 1 is a front elevation of a weighing-machine embodying my present improvements. Fig. 2 is an end elevation of the machine as seen from the right in Fig. 1, the parts being in the positions occupied thereby at the commencement of operation and fragments of the framing and load-receiver being removed more clearly to illustrate certain peculiar features of the invention. Figs. 3 and 4 are views similar to Fig. 2 and show the machine at two successive stages in its operation. Figs. 5, 6, and 7 are longitudinal central sections of the supply apparatus and a portion of the load-receiver. Fig. 8 is a detail view in plan of a portion of the latch that controls the discharge of the weighing mechanism.

Similar characters designate like parts in all the figures of the drawings.

The framework for carrying the various sets of mechanisms and parts may be of any suitable or preferred construction, it comprising in the present case the approximately U-shaped supporting base or bed 2, the end frames or uprights 3 and 4, which rise therefrom, and the brackets 5 and 6, which extend oppositely from the supply-hopper H, the latter being preferably cast integral with said brackets.

My present invention includes overloading and load-reducing means, preferably operative in this order during the weighing of a load, the overloading means being intended to deliver to the load-receiver of the weighing mechanism a supply of material in excess of or beyond that determined upon for a true charge, the surplus being subsequently removed by the load-reducing means. The hopper H, in conjunction with a suitable stream-controller or valve, constitutes a convenient means for overloading the load-receiver.

The weighing mechanism consists of a load-receiver, such as G, and a supporting scale-beam therefor, such as B. The scale-beam B, which is fulcrumed or pivotally supported upon suitable brackets extending inward from the uprights 3 and 4, consists of a pair of longitudinal arms joined at the rear by the combined counterweight and connecting-shaft W, said beam-arms being furnished with the usual knife-edges, upon which are borne V-shaped bearing-plates connected with the opposite ends of the load-receiver G.

The hopper H has two chambers, the lower chamber, which is designated by 7, being much larger than the upper chamber 8, the latter being disposed at one side of the lower chamber and having its floor made up of the oppositely-inclined sections 9 and 10, respectively, the space between the discharge edges of such inclined portions of the upper chamber forming a discharge-outlet therefor. The lower chamber or compartment 7 of the hopper H serves to store the material which is delivered thereinto by the upper or supply chamber 8 it being furnished with a valve to retain the material therein, and said valve is designated by V, it being represented as shut in Fig. 5, and the storage-chamber 7 of the hopper H being nearly filled with a mass of material. On the opening of the valve V the stored mass will be discharged rapidly into the load-receiver G, as shown in Fig. 6, to nearly fill the load-receiver. The outlet of the upper chamber is somewhat smaller than the outlet of the lower chamber. During the load-reducing period when the valve V is closed, as shown in Fig. 5, the lower chamber can be filled with material that is to be subsequently discharged into the load-receiver to nearly make up the predetermined charge. When the material is discharged from the lower chamber 7, the valve V being wide open, as shown in Fig. 7, the upper or supply chamber 8 of the hopper will deliver a stream directly against the stream-brake 12, which is near the outlet of the lower chamber and which is inclined, so that the force of impact of the mass is materially modified, and when it passes from such inclined stream-brake it will be loosened up or disintegrated and can pass through the outlet of the lower chamber without seriously affecting the action of the weighing mechanism, as is frequently the case with certain existing types of weighing-machines.

The valve V consists of a concave plate suitably suspended from the two-part supporting-shaft 13, which is furnished with openings in its opposite ends for receiving suitable journals carried by the framework of the machine. The valve-closing actuator consists in the present case of the weight 14, formed on the rear end of the arm 15 of the valve-supporting shaft 13, said weight exerting a constant valve-closing action, which, however, is governed by the weighing mechanism. The valve-opening actuator is designated by 16, and it consists of an auxiliary scale-beam shiftably carried by the main scale-beam B, it being pivoted thereto near the poising end of the latter, the weight W' of the auxiliary beam being furnished with the laterally-projecting pin 17', which normally rests upon the adjacent weight W of the main beam, as shown in Fig. 2, whereby on the descent of the load-receiver the auxiliary beam constitutes in effect a fixed extension of the main beam. The valve-closing arm 15 has pivoted thereto the depending rod 17, the free end of which bears against the auxiliary beam or actuator 16, so that as the load-receiver and beam mechanism descend during the weighing operation the auxiliary beam or actuator 16, by falling away from the rod 17, will permit the closure of the valve V to cut off the supply from the hopper H by the dropping of the actuator or weight 14.

The load-receiver has in its bottom the usual discharge-outlet, and for controlling the efflux of material therefrom I provide the closer L, which consists of a flat plate, adapted, when shut, to fit against the lower edge of the receiver, as shown in Fig. 2, said closer being pivotally connected to the load-receiver near one side of its discharge-outlet.

The load-discharge-controlling means includes a latch adapted to engage a member that is connected with the closer, such as the rocker R, which latter consists of the oppositely-disposed arms 20 and 21, fastened to the rock-shaft 22, that is mounted on the upper forward side of the load-receiver G. The arm 21 of the rocker R is connected to the closer L by the intermediate rod 23, pivotally attached, respectively, to these parts. The shaft 22 at the end opposite to that carrying the rocker is furnished with the open or skeleton segment 24, the arm 24' of which is connected to the closer L by the rod 25, which latter moves in parallelism with the rod 23 as the closer L reciprocates. The latch for holding the closer shut is designated by L', and in the form shown it consists of an angle-lever pivotally supported upon the load-receiver, and the arm 26 of said latch is weighted to carry it downward into engagement with the coöperating arm 20 of the rocker R, the movement of the latch being limited by the stop-pin 27 on the load-receiver, against which the lower arm 28 of the latch is adapted to abut when the latch is in its effective position. The working end of the latch-arm 26 is equipped with a projection 29, (see Fig. 8,) adapted to engage a corresponding projection 30 on the rocker R when the closer L is shut, as shown in Fig. 2. When the weighted arm 26 of the latch is raised sufficiently far to carry the projection 29 above the coöperating projection 30, the closer L will be released and can be forced open by the weight of the load within the load-receiver. For shutting the closer L it is furnished with the counterweighted end plates 31 and 32, respectively, which can be cast integral therewith.

The projection 29 on the end of the latch L' consists of a spring-bolt seated within the socket 33 of the latch and held in its effective position by the protractile spring 34, which is located within the socket 33 and bears against the inner end of the projection or bolt 29. The spring-bolt or projection 29 has a suitable pin thereon, which passes through a slot in the latch, whereby the movement of the said bolt is properly limited. On the shutting of the closer L the rocker-arm 20 will be swung about its axis therewith, and when it has nearly reached its normal position the projection 30 thereon will impinge against and force the bolt 29 into its seat, and when these parts have passed out of engagement the bolt will be immediately forced outward by the spring 34, where it can engage the projection 30 to again hold the closer L shut.

The load-reducing means in the present case includes a conveyer which is thrown into action at a predetermined point and which is operable for forcing from the load-receiver the surplus or overload previously supplied thereto, said conveyer being designated by C and being mounted upon the load-receiver.

The conveyer C is in the form of a screw, its shaft 35 being journaled in bearings on the casing 36 and the load-receiver G, respectively, said casing being suitably fastened to the lower forward side of the load-receiver. The inner end of the casing 36 is arched or concave and forms a partial hood for the screw conveyer, which extends for a short distance into the load-receiver to facilitate the removal of material therefrom at the proper stage. The conveyer C in the present case is operated by an electric motor which is thrown into and out of operative relation therewith, a current from a suitable source of electrical energy being intermittently shunted to the motor to thereby start the load-reducing conveyer C, whereby it can remove the surplus previously delivered to the load-receiver, this action taking place prior to the discharge of the true load.

The electric motor is designated by M, and it is of the ordinary construction, said motor being housed within the casing 36. The shaft of the motor is designated by 37, it being journaled in the outside wall of the casing 36 and carrying the loose pinion 38, which meshes with the gear 39 on the conveyer-shaft 35, said last-mentioned gear being suitably fixed to its shaft, as by keying. The motor-shaft has thereon a clutch C' of ordinary construction, the fixed member being designated by 40 and being conveniently cast on the inside face of the pinion 37, the slidable member of the clutch being designated by 41, and when the two members are in engagement and the motor is in operation the conveyer C will be driven for removing the overload.

The clutch members 40 and 41 will be coupled at a predetermined point in the operation of the machine, and subsequently the electric current will be shunted to the motor to drive the conveyer C through the interposed gearing. The slidable clutch member is preferably electrically operated, its actuator being connected with the core of a solenoid M', the latter being a multiple solenoid, or consisting of two individually-operative solenoids, which on being successively energized can draw the core thereof in or out, as will hereinafter appear. The core of the multiple solenoid is designated by 42 and the individual solenoids by 43 and 44, respectively, they being suitably attached to and insulated from the supporting-bracket 45, which is suitably attached to the load-receiver.

A series of batteries are represented at B', the wire $x$ leading from one of the end batteries of the series and being electrically connected with the circuit-controller or switch C", while the wire $x'$ leads from the opposite end battery to the solenoids 43 and 44, respectively, whereby on the closing of the circuit by the switch or circuit-controller C" one or the other of the two solenoids is energized for operating the core 42. The circuit-controller or switch C" is pivotally supported upon the load-receiver, and its action will be governed by the weighing mechanism as it falls and rises, said circuit-controller being in the form of an angle-lever, one of the arms of which is coöperative preferably with a suitable resistance member on the framework, as will hereinafter appear.

An insulated bracket is shown at 46 attached to the load-receiver adjacent to the multiple solenoid M', it having the terminal points 47 and 48, respectively, which are electrically connected by short wires to the solenoids 43 and 44, respectively. The action of the switch C", as hereinbefore stated, is governed or controlled by the weighing mechanism, the arm 49 of said switch having a projecting pin 49', which is situated within the notch or recess 50 of the resistance member or arm 51 on the end frame 3.

The actuator for the slidable clutch member is designated by 52, and it is represented as a depending bifurcated arm fixed to the transverse rock-shaft 53, which is located within and carried by the end walls of the motor-casing 36, the respective branches of the bifurcated arm or actuator being furnished with the usual projecting pins disposed within a peripheral channel or groove in the slidable clutch member 41. The shaft 53 has fixed thereto at its outside end the rock-arm 54, the upper end of which is pivoted to the link 55, the latter being similarly connected with the core 42 of the solenoid M'.

Fig. 2 represents the positions occupied by the different parts at the commencement of operation, the valve V being wide open and the load-receiver being at the limit of its upstroke, so that the major supply can be discharged bodily into the load-receiver to rapidly overload the same to cause its descent, and the arm 56 of the circuit-controller or switch C" will be at one side, or to the left, of the switch-terminal 47.

As the load-receiver descends (the switch-arm 49 being joined to the resistance-arm 51) the switch-arm 56 will be swung to the right in correspondence therewith and will pass in contact with the terminal 47, which throws the solenoid 43 into the circuit, but without affecting the core 42, said solenoid being wound left-handed. The load-receiver and switch-arm 56 will continue their respective movements, and said arm 56 will subsequently move in contact with the switch-terminal 48, this operation taking place about the time the load-receiver has reached the poising-line, it having a mass of material therein about equal to the predetermined charge. As the switch-arm 56 touches the terminal 48 the solenoid 44, which is a right-hand one, will be energized and will instantly draw the core 42 inward, whereby the latter is adapted through the interposed connections for throwing the slidable clutch member 41 into engagement with the fixed member 40, so that when the motor M is subsequently thrown into circuit the conveyer C through the intermediate gearing can be driven to remove the surplus from the load-receiver.

A conductor or wire is represented at $y$ leading from the batteries B' to the motor M and from thence to the terminal 60, the latter being in the form of a forked spring-arm suitably fixed to the bracket 61 on the end frame 3 and insulated therefrom, the coöperating terminal being shown at 62, fastened to and insulated from the post 62' on the bracket 61, said terminal being electrically connected by the wire $y'$ to the wire $x$, which is also in the electrical circuit. The device for making and breaking the motor-circuit is designated by 63, it consisting of a link pivoted to the terminal 62 and also to the link 64, which is likewise attached to the bracket 65 on the load-receiver. The make-and-break device or circuit-controller 63 has about midway thereof the bulge 63', which is adapted to enter between the branches of the forked spring-terminal 60 when the load-receiver has passed below the poising-line to thereby close the motor-circuit, and when this last-mentioned operation takes place the motor, of course, will be driven to operate the feed-conveyer. At about the time the load-receiver has passed below the poising-line, as represented in Fig. 3, the circuit-controller 62 will be in contact with the terminal 60, thereby, as just stated, closing the motor-circuit to start the motor, and consequently its shaft 37, so that the two gears 38 and 39, and consequently the conveyer-screw C, will be rotated.

The closer L, it will be remembered, is adapted to cover the discharge-outlet of the load-receiver, and it also constitues a partial floor for the conveyer-casing, said closer having the projecting portion 66, which extends for a short distance forward from the load-receiver, or about half the length of said conveyer, it being contiguous thereto, as represented in Fig. 2, whereby the accidental escape of material from the load-receiver during the weighing operation is prevented. When, however, the conveyer is started to force the excess of material from the load-receiver, it will pass along the said closer projection 66 and into a suitable receiver. For the purpose of receiving the surplus removed from the load-receiver prior to the discharge of a true load thereby the branch or conduit 67 of the duplex hopper H′, which is suitably fixed below the load-receiver, will be utilized, said branch conduit being suitably connected to the receiving end of the main or large conduit 68, the latter being intended to receive the true or weighted load on its discharge. The inlet-opening of the branch conduit 67 will be normally covered by a deflector or valve, as 69, the latter consisting of a flat plate pivotally supported at the side of the inlet and adapted when closed to rest upon a suitably-positioned stop. The deflector or valve 69 will be preferably connected to the weighing mechanism or the electrically-operated devices thereon for actuation, whereby, just prior to the removal of the surplus, it may be swung open to permit said surplus to pass into the branch or auxiliary conduit 67, from whence it can be conducted to the hopper H by elevator apparatus, as in the manner shown by the Letters Patent hereinbefore referred to. The supporting-shaft 70 of the deflector has fixed thereto the crank-arm 71, which is connected by the link or rod 72 to the lower arm 73 of the lever L″, pivotally mounted on the bracket or extension 73′ of the end frame 3, the upper arm 74 of said lever being connected by the link 75 to the clutch-operating rock-arm 54, the connection between said link 75 and rock-arm 54 being a loose one, whereby the weighing mechanism can ascend and descend without affecting the position of the deflector 69.

When the solenoid 44 is energized in the manner hereinbefore set forth, the slidable clutch member 41 will be thrown into engagement with its mate 40 through the action of the solenoid-core 42 and the intermediate connections, and the arm 54 will of course be swung to the right, moving the link 75 and the arm 74 of the lever in a corresponding direction, thereby, through the lever-arm 73, thrusting the link or rod 72 and the crank-arm 31 downward to open the deflector or valve 69, so that at a subsequent point, or when the conveyer C is started, the material that is withdrawn from the load-receiver can be fed into the branch or auxiliary conduit 67 of the duplex discharge-hopper H′. The tripper for the closer-latch L′ will be preferably carried by the solenoid-core 42, it being of the "by-pass" type, said tripper being designated by 77. The by-pass tripper is pivoted to the inner end of the solenoid-core 42, its weighted arm resting upon a suitably-positioned stop-pin 78 on said core. At the commencement of operation the latch-tripper 77 will be at the left of the latch-arm 28, as shown in Fig. 3. When, however, the solenoid 44 is energized, as hereinbefore stated, the core 42 will be drawn into said solenoid, thereby carrying the same to the right, and the vertical arm of the latch-tripper 77 will strike against the latch-arm 28 and will pass by the same ineffectively.

As soon as the material is withdrawn from the load-receiver during the load-reducing period the load-receiver will rise, thereby forcing the switch-arm 56 to the left, so that the solenoids 44 and 43 can be successively energized as said switch-arm passes in contact with the terminals 48 and 47. When the solenoid 43 is included in the circuit, the core 42 will be forced rapidly outward, this taking place at the time the true load is in the load-receiver, whereby the tripper 77, by impinging against the latch-arm 28, can raise the weighted arm 26 of said latch to disengage the latter from the rocker-arm 20, whereby the closer L will be released and can be forced open to discharge the load into the main or large conduit 68 of the duplex hopper, the valve 69 having been previously shut. When the core 42 is forced outward, the arm 54 will be swung to what is represented as the "left," so that it can, acting through the intermediate connections, shut the deflector or valve 69 to close the inlet-opening of the auxiliary or branch conduit 67, whereby the true load will be delivered into the main conduit 68 of the duplex discharge-hopper H′.

The open segment 24, to which I have hereinbefore referred, constitutes also an interlocking stop, it being reciprocally effective with a similar stop, such as 80, which is fixed to the valve-supporting shaft 13, said interlocking stop 80 being of a shape similar to its companion. When the valve is open and the closer L is shut, as represented in Fig. 2, the interlocking stop 24 will be adjacent to the curved face of the stop 80 so long as the valve V is open, whereby should the latch L′ be tripped too soon the action of the stop 24, and consequently the opening of the closer L, will be prevented, said stop 80 barring the advance of its mate 24. When the valve V is shut, as shown in Fig. 3, the stop 80 will have been carried across the plane of the curved face of the stop 24, so that when the latch is tripped the latter can swing about its center as the closer opens, the load-receiver having ascended somewhat from the position shown in Fig. 3, whereby the curved face of the stop 24 will be contiguous to the stop 80, as shown in Fig. 4, so that retractive movement of the stop 80, and hence of the valve V, will be positively blocked by the stop 24. The closer L being open the load-receiver and beam B are free immediately to return to their normal positions, but the auxiliary beam 16 cannot do so, as it is held against return movement by the interlocking stop 24, acting through the stop 80, the valve V, and the thrust-rod 17. When, however, the closer is shut, the stop 80, valve V, and auxiliary beam 16 will be released, so that the weight W' of the latter can drop until its pin 17' meets the main weight W, as shown in Fig. 2, and on such movement of the auxiliary beam the rod 17 will be raised thereby for forcing the valve V open.

The operation of the hereinbefore-described machine, briefly stated, is as follows: In Fig. 1 the load-receiver and beam are shown represented occupying their normal positions, the load-receiver being empty and the closer L shut and held in such position by the latch L', which is in engagement with the rock-arm 20, and the valve V having been just opened the stored mass of material within the lower chamber 7 of the supply-hopper H will be discharged bodily into the load-receiver G, nearly filling the same, and when a certain additional quantity of material has been delivered to the load-receiver from the hopper H it, with the beam B, will descend, and the auxiliary beam 16, moving simultaneously therewith and falling away from the rod 17, will permit the closure of the valve V by the dropping of the counterweight 14, said valve being represented shut in Fig. 3. As the weighing mechanism descends with the overload the switch-arm 56 will be swung inward in the manner hereinbefore specified and successively in contact with the switch-terminals 47 and 48, whereby the two solenoids 43 and 44 will be successively energized. When the solenoid 44 is energized, the core 42 thereof will be drawn quickly inward, thereby through the intermediate connections throwing the slidable clutch member 41 into engagement with the fixed clutch 46 on the pinion 40, so that at a subsequent stage, when the motor-circuit is closed by the falling of the circuit-controller 63 against the terminal 60, the conveyer C can be driven to force the surplus from the load-receiver G. As the clutch member 41 is operated in the manner just alluded to the deflector or valve 69 will be opened, as shown in Fig. 3, through its connections with the rock-arm 54, so that the material that is withdrawn from the load-receiver during the course of weighing can pass into the auxiliary or branch conduit 67. As the material is thus withdrawn from the load-receiver it will rise, thereby carrying the circuit-controller 63 out of contact with the terminal 60 to again break the motor-circuit and to stop the conveyer. At about the time the conveyer is stopped the switch-arm 56 will be nearly in contact with the terminal 47, so that on a slight further movement of the load-receiver said arm will be caused to contact with said terminal to thereby energize the solenoid 43, whereby the core 42 thereof will be thrown outward with the tripper 77 into engagement with the arm 28 of said latch and disengage it from the arm 20 of the rocker R to effect the release of the closer L. When the closer is thus released, the weight of material within the load-receiver will force the same open, such material being discharged into the large conduit 68 of the duplex hopper H', and when all the material has passed below the discharge edge of said closer it can be shut by the counterweighted plates 31 and 32 in the manner hereinbefore specified, and the respective parts of the weighing mechanism can then promptly return to their initial positions.

Having described my invention, I claim—

1. The combination, with weighing mechanism including a load-receiver, of overloading and load-reducing means therefor, the last mentioned embodying a conveyer; an electric circuit having a motor therein for operating said conveyer; driving connections between the motor and the conveyer; and means controlled by the weighing mechanism for closing said circuit at a predetermined point.

2. The combination, with weighing mechanism including a load-receiver, of overloading and load-reducing means therefor, the last mentioned embodying a conveyer; an electric circuit having a motor therein for operating said conveyer; driving connections between the motor and the conveyer, including a clutch; and means controlled by the weighing mechanism for successively coupling the clutch members and closing the motor-circuit.

3. The combination, with weighing mechanism including a load-receiver, of overloading and load-reducing means therefor, the last mentioned embodying a conveyer; an electric circuit having a motor therein for operating said conveyer; driving connections embodying a clutch, between the motor and the conveyer; a solenoid, the core of which is operable for coupling the clutch members; and means controlled by the weighing mechanism for energizing the solenoid and for closing the motor-circuit to thereby start the conveyer.

4. The combination, with weighing mechanism including a load-receiver, of overloading and load-reducing means therefor, the last mentioned embodying a conveyer; an electric circuit having a motor therein for operating said conveyer; a casing for housing said motor, said casing being carried by the load-receiver; driving connections between the motor and the conveyer; and means controlled by the weighing mechanism for closing said circuit at a predetermined point.

5. The combination, with weighing mechanism including a load-receiver, of overloading and load-reducing means therefor, the last mentioned embodying a conveyer; an electric circuit having a motor therein for operating said conveyer; a casing for housing said motor, said casing being attached to the load-receiver; driving connections between the motor and the conveyer, said connections being also housed within said casing; and means controlled by the weighing mechanism for closing said circuit at a predetermined point.

6. The combination, with weighing mechanism including a load-receiver, of overloading and load-reducing means therefor, the last mentioned embodying a conveyer; an electric circuit having a motor therein for operating said conveyer; a casing for housing said motor, said casing also constituting a partial hood for the conveyer and being attached to the load-receiver; driving connections between said motor and the conveyer; and means controlled by the weighing mechanism for closing said circuit at a predetermined point.

7. The combination, with weighing mechanism including a load-receiver, of overloading and load-reducing means therefor, the last mentioned embodying a conveyer; an electric circuit having a motor therein for operating said conveyer; a casing for housing said motor, said casing having a part thereof concave, said concave portion constituting a partial hood for the conveyer, said casing being attached to the load-receiver; driving connections between the motor and the conveyer; and means controlled by the weighing mechanism for closing said circuit at a predetermined point.

8. The combination, with weighing mechanism including a load-receiver, of overloading and load-reducing means therefor, the last mentioned embodying a conveyer; an electric circuit having a motor therein for operating said conveyer; a casing for housing said motor, said casing being attached to the load-receiver and having a concave portion which constitutes a partial hood for said conveyer; a clutch and gearing also situated within said casing and coöperative, respectively, with the motor and the conveyer; and means controlled by the weighing mechanism for coupling the clutch members and for closing said circuit at predetermined points.

9. The combination, with weighing mechanism including a load-receiver, of overloading and load-reducing means therefor, the last mentioned embodying a conveyer; electric circuits, one of which has a motor therein, the other having a solenoid with which is coöperative means for throwing the motor into mechanical connection with the conveyer; and means controlled by the weighing mechanism for successively closing the solenoid and motor-circuits.

10. The combination, with weighing mechanism embodying a load-receiver having a discharge-outlet; of overloading and load-reducing means, the last mentioned including a conveyer; driving mechanism for said conveyer; and a closer for said discharge-opening, said closer being adapted, when shut, to form a partial floor for the conveyer.

11. The combination, with weighing mechanism embodying a load-receiver having a discharge-outlet; of overloading and load-reducing means, the last mentioned including a conveyer carried by the load-receiver; driving mechanism for said conveyer; a closer for said discharge-outlet, adapted, when shut, to form a partial floor for the conveyer; and closer-holding means comprehending a latch.

12. The combination, with weighing mechanism embodying a load-receiver having a discharge-outlet, of a conveyer carried by said load-receiver; a casing attached to the load-receiver and constituting a partial hood for said conveyer; driving mechanism for said conveyer, housed within said casing; and a closer for said discharge-outlet, adapted, when closed, to form a partial floor for said conveyer.

13. The combination, with weighing mechanism embodying a load-receiver having a discharge-outlet, of a conveyer carried by said load-receiver; means for starting the load-receiver before the discharge of a load thereby; and a closer for said discharge-outlet, said closer being adapted, when shut, to form a partial floor for the conveyer.

14. The combination, with weighing mechanism including a load-receiver, of a duplex hopper, one of the conduits of which is intended to receive the true load discharged by the load-receiver; means for removing material from said load-receiver before the discharge of the true load and for delivering the same to the other conduit of said duplex hopper; and a shiftable deflector controlling the delivery of material to said conduits.

15. The combination, with weighing mechanism including a load-receiver; of a duplex hopper, one of the conduits of which is situated to receive the true load discharged by the load-receiver; means for removing material from said load-receiver before the discharge of the true load and for delivering the same to the other conduit of said duplex hopper; a deflector controlling the delivery of material to said conduits; and means controlled by the weighing mechanism for operating said deflector.

16. The combination, with weighing mechanism including a load-receiver, of overloading means therefor; a conveyer mounted on the load-receiver; driving mechanism for said conveyer, whereby it is adapted to remove the surplus from the load-receiver; a duplex hopper one of the conduits of which is situated to receive the surplus removed from the load-receiver; and means for effecting the discharge of the load into the other conduit of said duplex hopper.

17. The combination, with weighing mechanism embodying a load-receiver, of a conveyer; a motor; driving connections between said motor and conveyer, including a clutch; means for coupling the clutch members at a predetermined point; a duplex hopper; a deflector for controlling the delivery of material to the branches of said duplex hopper; and means for operating said deflector, said means being coöperative with the clutch-operating means.

18. The combination, with weighing mechanism including a load-receiver, of a duplex hopper; a deflector situated within said duplex hopper and controlling the delivery of material to the respective conduits thereof; a conveyer; a motor; driving connections between said motor and conveyer, including a clutch; a solenoid; an actuator for said clutch, connected with the solenoid; connections between said deflector and said solenoid; and means for energizing said solenoid.

19. The combination, with weighing mechanism including a load-receiver, of a duplex hopper; a deflector situated within said hopper; a conveyer; a motor; driving connections between said motor and conveyer, including a clutch; an actuator for said clutch; a solenoid, the core of which is connected with said clutch-actuator; a lever; and connections between said lever and solenoid and deflector, respectively.

20. The combination, with weighing mechanism including a load-receiver, of a conveyer; a motor; driving connections between said motor and conveyer, said connections including a clutch; a clutch-actuator; an electric circuit having a solenoid, the core of which is connected with said clutch-actuator; a circuit-controller; and a resistance member on the framework, coöperative with said circuit-controller.

21. The combination, with weighing mechanism embodying a load-receiver, of a conveyer operable for removing material from the load-receiver prior to the discharge of its load; load-discharge-controlling means including a latch; a motor; driving connections between said motor and conveyer, including a clutch; a clutch-actuator; a multiple solenoid, the core of which is connected with said clutch-actuator; an electric circuit having two terminals connected with the solenoid; a circuit-controller adapted to alternately pass in contact with said terminals as the load-receiver descends and ascends during the making of a load; and a latch-tripper coöperative with said solenoid-core.

22. The combination, with weighing mechanism embodying a load-receiver; a conveyer operable for removing material from the load-receiver; two electric circuits, one of which has therein a motor; driving connections between said motor and the conveyer, including a clutch; a solenoid in one of said circuits; a clutch-actuator connected to the core of said solenoid; a circuit-controller governed by the weighing mechanism and operable at a predetermined point for closing the solenoid-circuit; and a second circuit-controller also governed by the weighing mechanism and operable for subsequently closing the motor-circuit.

23. The combination, with weighing mechanism embodying a load-receiver, of a conveyer operable for removing material from the load-receiver; a motor; driving connections between said motor and the conveyer, including a clutch; a clutch-actuator; a solenoid, the core of which is connected to the said actuator; a circuit-controller consisting of an angle-lever carried by the load-receiver; and a resistance member on the framework, coöperative with one of the arms of said angle-lever.

24. The combination, with weighing mechanism embodying a load-receiver, of means for supplying an overload to said load-receiver; a conveyer carried by the load-receiver; an electric circuit having a motor therein; driving connections between said motor and conveyer; and a circuit-controller connected, respectively, with the load-receiver and the framework, for closing the motor-circuit at a predetermined point, thereby to start the conveyer in operation to cause it to remove the surplus from the load-receiver.

25. The combination, with weighing mechanism embodying a load-receiver, of a conveyer operable for removing material from said load-receiver; a motor; driving connections between the motor and the conveyer, embodying a clutch; an actuator for said clutch; a shaft from which said actuator is suspended; a rock-arm attached to said shaft; a solenoid, the core of which is connected with said rock-arm; and means for energizing said solenoid at a predetermined point.

26. The combination, with a load-receiver having a discharge-outlet, of a conveyer carried by the load-receiver and operable for removing material therefrom before the discharge of a load; a closer for said discharge-outlet, having a part thereof constituting a partial floor for the conveyer; and a duplex hopper, one of the conduits of which is situated to receive the material removed from the load-receiver.

FRANCIS H. RICHARDS.

Witnesses:
FRED. J. DOLE,
F. N. CHASE.